United States Patent
Adam et al.

(10) Patent No.: US 12,339,212 B2
(45) Date of Patent: Jun. 24, 2025

(54) DEVICE FOR THE SEQUENTIAL TESTING OF FILTERS AND THEIR USE

(71) Applicant: TOPAS GMBH TECHNOLOGIE-ORIENTIERTE PARTIKEL-, ANALYSEN- UND SENSORTECHNIK, Dresden (DE)

(72) Inventors: René Adam, Dresden (DE); Franziska Nowak, Dresden (DE); Andreas Rudolph, Dresden (DE)

(73) Assignee: TOPAS GMBH TECHNOLOGIE-ORIENTIERTE PARTIKEL-, ANALYSEN- UND SENSORTECHNIK, Dresden (DE)

( * ) Notice: Subject to any disclaimer, the term of this patent is extended or adjusted under 35 U.S.C. 154(b) by 91 days.

(21) Appl. No.: 18/546,930

(22) PCT Filed: Dec. 28, 2021

(86) PCT No.: PCT/EP2021/087732
§ 371 (c)(1),
(2) Date: Aug. 17, 2023

(87) PCT Pub. No.: WO2022/174971
PCT Pub. Date: Aug. 25, 2022

(65) Prior Publication Data
US 2024/0133789 A1    Apr. 25, 2024
US 2024/0230504 A9    Jul. 11, 2024

(30) Foreign Application Priority Data
Feb. 18, 2021  (DE) .................. 10 2021 103 867.7

(51) Int. Cl.
*G01N 15/08* (2006.01)

(52) U.S. Cl.
CPC .... *G01N 15/0806* (2013.01); *G01N 2015/084* (2013.01)

(58) Field of Classification Search
CPC .... G01N 15/00; G01N 15/08; G01N 15/0806; G01N 2015/084
See application file for complete search history.

(56) References Cited

U.S. PATENT DOCUMENTS

2011/0290120 A1    12/2011  Huza et al.

FOREIGN PATENT DOCUMENTS

CN    112161906 A  *  1/2021  .......... G01N 15/0826
DE    4215783 A1      11/1993
(Continued)

OTHER PUBLICATIONS

Machine translation of CN-112161906-A (Year: 2021).*
(Continued)

*Primary Examiner* — Nguyen Q. Ha
(74) *Attorney, Agent, or Firm* — Heslin Rothenberg Farley & Mesiti P.C.

(57) ABSTRACT

The invention relates to devices for the sequential testing of filters comprising couplers for connection to the filter to be tested, a first assembly having an aerosol generator and a first measuring device for determining the aerosol concentration of the air, and a second assembly having a device for sucking in air in connection with a second measuring device for determining the aerosol concentration of the air downstream of the filter. The devices are distinguished, in particular, by a short preparation time and a short postprocessing time during the measurement time of the filter to be tested. For this purpose, the raw gas-side coupler is connected to a non-return valve. Furthermore, the first assembly is connected to the raw gas-side coupler via a first shut-off valve, the second assembly is connected to the clean gas-
(Continued)

side coupler via a second shut-off valve and the actuating devices of the shut-off valves are connected to a control device.

18 Claims, 1 Drawing Sheet

(56) References Cited

FOREIGN PATENT DOCUMENTS

| | | |
|---|---|---|
| DE | 202012101230 U1 | 4/2012 |
| DE | 102018111552 B3 | 9/2019 |

OTHER PUBLICATIONS

International Search Report and Written Opinion of International Application No. PCT/EP2021/087732, mailed on Apr. 13, 2022, Full translation.

* cited by examiner

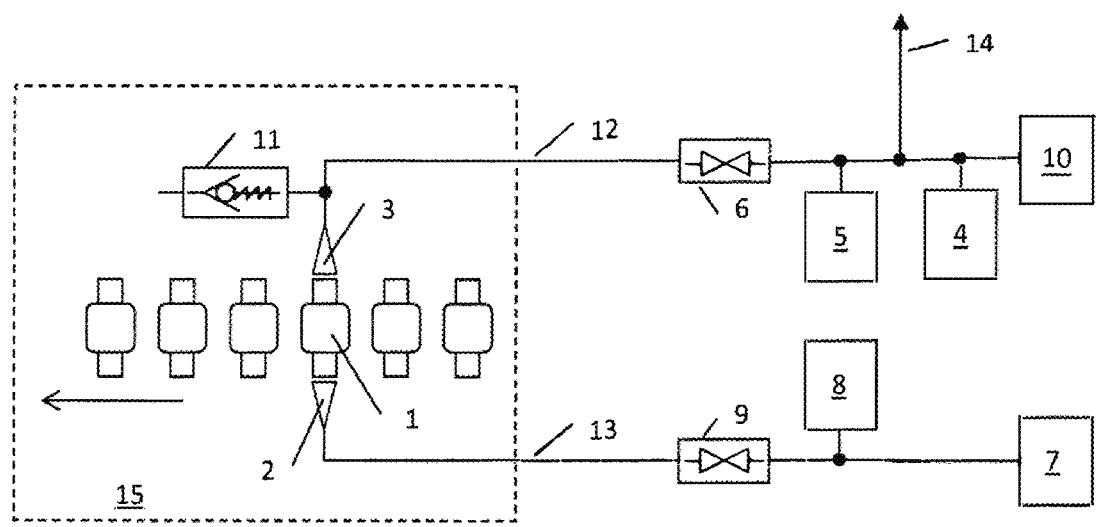

DEVICE FOR THE SEQUENTIAL TESTING OF FILTERS AND THEIR USE

CROSS REFERENCE TO RELATED APPLICATIONS

This application is a national stage filing under section 371 of International Application No. PCT/EP2021/087732, filed on Dec. 28, 2021, and published on Aug. 25, 2022 as WO 2022/174971, which claims priority to German Application No. 10 2021 103 867.7, filed on Feb. 18, 2021. The entire contents of WO 2022/174971 are hereby incorporated by reference herein.

The invention relates to devices for the sequential testing of filters, and their uses.

The document DE 20 2012 101 230 U1 includes a device for quality testing of highly efficient particle filters for the air of pure and clean rooms. A substantial portion of the cycle time is taken up by the introduction and removal of the test object into and out of the test device, in particular when this process is carried out manually on grounds of a reasonable budget. Introducing the particle filters successively into the device and thus into the aerosol stream is eliminated in part in the device, for quality inspection. The testing and the introduction and removal of the test object into and out of the device is realized temporally in parallel. For this purpose, chambers for one particle filter in each case, as a test object, are arranged in parallel with one another. These can be selectively looped into the aerosol stream by means of switching valves.

Document DE 42 15783 A1 discloses a method and a device for determining the filtration effect of filters for filtering air, gases or liquids on filling and closing machines or the like, in particular in sterile air preparation. Thereby, a filter test system is integrated into a sterile air system, which comprises an aerosol generator and a particle measuring device, wherein a test aerosol is applied to one side of the filter, and a particle measurement is carried out on the other side of the filter, in the exiting air flow. The filter test system has only one particle counter on the clean side of the filter. During testing of the filter, test aerosol reaches the clean side, and thus the particle counter, via the unclean side of the filter and the filter. In reverse operation, the test aerosol reaches the clean side with the particle counter.

The document DE 10 2018 111 552 B3 relates to devices for testing the degree of separation of a filter for quality assurance. To this end, partial flows from the clean gas flow downstream of the filter are withdrawn, and the particle concentrations are measured. Since the measurement of particles and the partial flow withdrawal are a statistical process, the reliability of the result increases with the portion of the sampling that is actually evaluated. In order to protect the particle counters used in this case, in open adapters a device for supplying particle-free gas is used.

The document DE 20 2012 101 230 U1 discloses a device for quality testing of highly efficient particle filters for the air of pure and clean rooms. The device comprises a generating unit of a test volume flow from aspirated ambient air, an inflow line having an aerosol generator and inflow-side aerosol sampling on the generating unit, in each case via a first switching valve and an inlet having openable chambers connected to the inflow line, for a respective particle filter, an outflow line provided with outflow-side aerosol sampling, the outlet of each chamber being connected to the outflow line via a second switching valve in each case, a particle counter device connected to either the inflow-side aerosol sampling or the outflow-side aerosol sampling via a device for sampling, and a control device for at least the generation unit, the aerosol generator, the first switching valves and the second switching valves. The inflow line comprising the chambers, connected to the exhaust air line via the outflow line, is arranged downstream of the generating unit of the test volume flow of drawn-in air.

The document DE 10 2018 111 552 B3 relates to a device for testing the degree of separation of a filter for quality assurance. The device comprises a device for preparing the test airflow and an aerosol line, sampling for determining the untreated gas concentration of the test air containing the aerosol using a first particle counter, an untreated gas-side adapter for filter coupling, the filter to be tested, a clean gas-side adapter for filter coupling, a device for supplying particle-free gas, second particle counters connected in parallel for measuring the particles in the clean gas, and a device for generating the volume flow. Furthermore, the device comprises flow meters for determining the volume flow through the second particle counters, so that the sum of the volume flow through the second particle counters is equal to or greater than the nominal volume flow of the filter. A difference can be fed in by supplying particle-free gas at the input of the particle counters. The device is suitable for testing the degree of separation of filters to be placed in succession, it being necessary for the test conditions in the device to be provided again after each test. This device is not suitable for sequential testing of filters with a short preparation time and a short postprocessing time during the measurement time of the filter to be tested.

The object of the invention is to implement a device for the sequential testing of filters having a short preparation time and a short postprocessing time during the measurement time of the filter to be tested.

This object is achieved by the features set out in the independent claims.

The devices for the sequential testing of filters and their uses are characterized in particular by a short preparation time and a short postprocessing time during the measurement time of the filter to be tested.

For this purpose, the device has
- a first assembly having an aerosol generator and a first measuring device for determining the aerosol concentration of the air as raw gas,
- a raw gas-side coupler for connection to the filter to be tested, which is connected via a first shut-off valve to the first assembly and to a non-return valve,
- a clean gas-side coupler for connecting to the filter to be tested,
- a second assembly comprising a device for sucking in air in connection with a second measuring device for determining the aerosol concentration of the air as a clean gas downstream of the filter, which is connected via a second shut-off valve to the clean gas-side coupler, so that the volume flow is brought about on the clean gas-side of the filter and, when the coupling is closed at the filter, aerosol is sucked through the feed lines from the aerosol generator, and
- a control device in connection with actuating devices of the shut-off valves, the couplers being connected to the filter and the shut-off valves being opened and the first assembly, the filter and the second assembly thus being connected to one another for testing the filter, the first shut-off valve being closed in succession after the testing of the filter and before the opening of the couplers, so that the non-return valve opens and ambient air flows through the raw gas-side coupler, and the second shut-off valve is then closed so that no ambient air can flow into the clean gas-side coupler, the couplers being opened by the tested filter when the shut-off valves are closed, and the couplers being connected to the next filter to be tested, such that the first line is already filled with aerosol when the next filter is tested.

The device is advantageously characterized in that cyclically and continuously produced filters can be tested with regard to their separation quality. In industrial manufacturing processes for filters, in particular air filters, it is often the case that similar products are produced in very high numbers per unit of time, which means a very short cycle time of the production process.

Therefore, for a complete functional test, the filter test must also be carried out in this short cycle time. The filters are tested by means of a filtration experiment. For this purpose, gas-borne particles are passed through the filter as an aerosol. The concentration of the aerosol fed to the filter, frequently referred to as raw gas, and the concentration of the aerosol that has flowed through the filter, frequently referred to as clean gas, are determined by means of particle measurement technology. The reciprocal quotient of these concentrations is referred to as the transmittance and characterizes the quality of a filter.

A particularity of the concentration measurement of an aerosol is the reduction in measurement accuracy that occurs when the available measurement time is reduced. This is due to the statistics of the particles passing through the filters. The statistical certainty decreases disproportionately with a shorter measurement time. The number of particles per unit of measurement time also depends on the degree of separation and the particle concentration in the raw gas of the filter. However, the latter parameters are usually defined in a specific test situation. This circumstance leads to the aim of achieving a maximum of actual measurement time within the overall time available for the test.

If identical filters are tested sequentially in a test device, the cycle time results from the change from one filter to the next, considered in each case at the same stage within the cycle. The time available for the actual filter test is only a portion of the cycle time, since further and necessary method steps require a handling time. Examples of components of the handling time are the times of transport of the filter into the test device, the delivery of a device for the guidance of the aerosol at the input and output of the filter (coupling), and the analogous steps in the reverse order after the filter test.

The time available for the filter test can thus be subdivided into three time portions:
first, a preparation time, which is required for setting the volume flow, setting a temporally constant clean gas concentration, and other compensation processes,
second, the actual measurement time, and
third, a postprocessing time for creating the conditions that allows the coupling to be opened by the filter. The conditions for this are an interrupted volume flow from and to the filter, and the opened couplings being free of particles, so that no aerosol is released into the environment.

For a given cycle time, a maximum measurement time should now be achieved with a handling time that is usually predetermined in terms of technology. This is achieved if mainly the preparation time and the postprocessing time are minimized.

The device for the sequential testing of filters is advantageously used to maximize the measurement time by minimizing preparation time and postprocessing time. In this case, boundary conditions of the industrial environment of the filter production are advantageously taken into account at the same time. The boundary conditions resolved for this are the following.

First, the space requirement in the immediate region of the production line, in the course of which the testing expediently also takes place in an integrated manner, is often very limited. Thus, the entire equipment for filter testing cannot be placed on the production line. The coupling of the filter to the fluid-conducting systems on the raw and clean gas-side is frequently spaced apart from the actual test device for structural reasons. This is particularly important because, in this way, the aerosol, which is guided to the filter as raw gas, is measured, with respect to its concentration, at a distance from the filter. This likewise applies to the aerosol guided away from the filter as a clean gas.

Second, the flow of the aerosol must be influenced in such a way that, when the coupling of the filter test device to the next filter is opened, no aerosol escapes into the environment. For this purpose, the flow of the aerosol is to be interrupted and any cavities which may be accessible during opening are to be rinsed out with particle-free or low-particle air before opening. The scavenging air is to be fed to the exhaust air.

The device for sequential testing of filters generates a volume flow through the filter. Since the separation in the filter is dependent on this volume flow, it is tested at the nominal volume flow of the filter specification. For this purpose, the device is designed for suction operation. This mode of operation has the advantage that possible leaks do not lead to the escape of aerosol into the environment. In this case, the aerosol generator provides the required aerosol.

The suction operation means that the volume flow is applied to the clean gas side of the filter and, in the case of a closed coupling at the filter, aerosol is drawn through the feed lines from the aerosol generator.

If no filter is then adapted at the transition from one filter to the next, the connections on the raw gas-side and on the clean gas-side are shut off. On the one hand, the entirety of the raw gas is now conducted into the exhaust air by shutting off the feed line to the filter and, on the other hand, the clean gas-side suction line is shut off.

The first assembly comprises an exhaust air line in connection with the device for generating particle-free air, the aerosol generator and the first measuring device for determining the aerosol concentration of the raw gas. The device for generating particle-free air, the aerosol generator and the first measuring device for determining the aerosol concentration of the raw gas are connected to the control device. The aerosol of the aerosol generator usually contains sufficient particles, but the volume flow is too low in order to operate the filters according to the specification. For this reason, particle-free air is added to the aerosol. In this case, the aerosol can be provided with an excess with respect to the volume flow, which can then be conducted away via the exhaust air line. The advantage of this procedure is an aerosol that is constant in its concentration, even in the event that filters of different nominal volume flows are to be tested.

Advantageous embodiments of the invention are specified in the dependent claims.

In embodiments of the invention, the first assembly comprises a device for generating particle-free air in connection with the aerosol generator and the first measuring device for determining the aerosol concentration of the raw gas. The aerosol of the aerosol generator usually contains sufficient particles, but the volume flow can be too low to operate the filters according to the specification. For this reason, such air is added to the aerosol of the aerosol generator by means of the device for generating particle-free air.

In embodiments of the invention, the couplers are advantageously each connected to a drive for closing and opening the connections between the couplers and the filter to be tested. Furthermore, the drives are connected to the control device.

In embodiments of the invention, filters that are to be tested and have been tested can optionally be arranged on a carrier comprising a drive, so that the filter to be tested in each case can be positioned relative to the couplers and the filters to be tested can be tested in sequence.

The invention also relates to the use of the device for the sequential testing of filters.

To realize the invention, it is also expedient to combine the above-described embodiments and the features of the claims.

The invention is explained in more detail below with reference to an embodiment and associated figures. In this case, the embodiment is intended to describe the invention without limiting it.

In the drawings:

FIG. 1 shows a device for the sequential testing of filters.

A device for the sequential testing of filters 1 consists substantially of an raw gas-side coupler 3 for connecting to the filter 1 to be tested, a clean gas-side coupler 2 for connecting to the filter 1 to be tested, a first assembly having an aerosol generator 4 and a first measuring device 5 for determining the aerosol concentration of the air as raw gas, a second assembly having a device 7 for sucking in air in connection with a second measuring device 8 for determining the aerosol concentration of the air as clean gas downstream of the filter 1, a non-return valve 11, a first shut-off valve 6 and a second shut-off valve 9, a device 10 for generating particle-free air, an exhaust air line 14 and a control device.

FIG. 1 is a schematic view of a device for the sequential testing of filters 1.

A first assembly comprises the device 10 for generating particle-free air in connection with the aerosol generator 4 and the first measuring device 5 for determining the aerosol concentration of the raw gas. An exhaust air line 14 is present in connection with the device 10 for generating particle-free air, the aerosol generator 4 and the first measuring device 5 for determining the aerosol concentration of the raw gas. Thus, an aerosol produced by the aerosol generator 4 is mixed with particle-free air of the device 10 for generating particle-free air, and either fed completely to the exhaust air line 14 or used in part for the filter test. The aerosol concentration of this mixture referred to as raw gas is measured by means of the first measuring device 5. The first assembly is connected via the first shut-off valve 6 to the raw gas-side coupler 3, the raw gas being fed to the locally spaced raw gas-side coupler 3 by means of a first line 12. The raw gas-side coupler 3 is furthermore connected to the non-return valve 11. The aerosol flows through the filter 1 to be tested and is now referred to as clean gas. The clean gas-side coupler 2 is connected to a second assembly via a second line 13 and the second shut-off valve 9. Said second assembly has the device 7 for sucking in air in connection with the second measuring device 8 for determining the aerosol concentration of the air as clean gas downstream of the filter 1. Here, the aerosol concentration is measured again. The volume flow through the filter 1 to be tested is generated by means of the device 7 for sucking in air. The device 10 for generating particle-free air, the aerosol generator 4, the first measuring device 5 for determining the aerosol concentration of the raw gas, the actuating device of the first shut-off valve 6, the device 7 for sucking in air, the second measuring device 8 for determining the aerosol concentration of the air as a clean gas, and the actuating device of the second shut-off valve 9 are connected to the control device.

The actuating devices of the shut-off valves 6, 9 are connected to the control device in such a way that the couplers 2, 3 are connected to the filter 1 for testing the filter 1, and the shut-off valves 6, 9 are open and the first assembly, the filter 1 and the second assembly are thus connected to one another, after the testing of the filter 1 and before the opening of the couplers 2, 3 in succession, the first shut-off valve 6 is closed so that the non-return valve 11 opens and ambient air flows through the raw gas-side coupler 3, and the second shut-off valve 9 is then closed so that no ambient air can flow into the clean gas-side coupler 2, the couplers 2, 3 are opened by the tested filter 1 when the shut-off valves 6, 9 are closed, and the couplers 2, 3 are connected to the next filter 1 to be tested.

A minimization of the preparation time and the postprocessing time during the measurement time of the filter to be tested thus takes place when the filter coupling, consisting of the couplers 2, 3, is to be opened in order to bring the next filter 1 into position. Thus, the first shut-off valve 6 is closed first. As a result, no more aerosol can be drawn in. Rather, the spring-loaded non-return valve 11 opens. As a result, ambient air flows through the raw gas-side coupling and flushes this out. Thereafter, the second shut-off valve 9 is closed so that no ambient air can flow into the clean gas-side filter coupling. Only after these steps is the filter coupling opened. It is important that the shut-off valves 6, 9 do not have a common drive, because they have to be actuated at different points in time. As a result of this arrangement of the two shut-off valves 6, 9 and of the non-return valve 11, the filter coupling can be opened as quickly as possible after completion of the actual measurement time. Furthermore, the first line 12 is already filled with aerosol when the next filter 1 is tested.

Filters 1 that are to be tested and have been tested can be arranged on a carrier 15 comprising a drive, so that the filter 1 to be tested in each case can be positioned relative to the couplers 2, 3, and the filters 1 to be tested can be tested in sequence.

REFERENCE SIGNS 1 filter
2 clean gas-side coupler
3 raw gas-side coupler
4 aerosol generator
5 first measuring device
6 first shut-off valve
7 device for sucking in air
8 second measuring device
9 second shut-off valve
10 device for generating particle-free air
11 non-return valve
12 first line
13 second line
14 exhaust air line
15 carrier

The invention claimed is:

1. A method for sequential testing of filters (1) using a device, the device comprising a first assembly comprising an aerosol generator (4) for generating aerosol and a first measuring device (5) for determining an aerosol concentration in a raw gas upstream of a filter (1) to be tested, and a raw gas-side coupler (3) connected at its first end to an upstream side of the filter (1) and connected at its second end via a first shut-off valve (6) to the first assembly (4, 5) and to a non-return valve (11) arranged in parallel with the first shut-off valve (6), a second assembly comprising a device (7) for sucking the raw gas or ambient air upstream side of the filter (1) and a second measuring device (8) for determining an aerosol concentration in a clean gas downstream of the filter (1), and a clean gas-side coupler (2) connected at its first end to a downstream side of the filter (1) and connected at its second end via a second shut off valve (9) to the second assembly (7, 8), and a control device connected to actuating devices of the shut-off valves (6, 9), wherein the shut-off valves (6, 9) do not have a common drive, the method comprising the following steps i-iv i) testing the filter (1), wherein the couplers (2, 3) are connected to the filter (1) and the shut-off valves (6, 9) are opened, thus connecting the first assembly (4, 5), the filter (1) and the second assembly (7, 8) together, ii) after testing the filter (1) and before disconnecting the couplers (2, 3) from the filter (1), closing the first shut-off valve (6) so that the non-return valve (11) opens and ambient air flows through the non-return valve (11) into the raw gas-side coupler (3) to flush out any raw gas in the raw gas-side coupler (3), and then closing the second shut-off valve (9) so that no ambient air flows into the clean gas-side coupler (2), iii) disconnecting the couplers (2, 3) from the tested filter (1) with both the shut-off valves (6, 9) being closed, iv) connecting the couplers (2, 3) to the next filter (1) to be tested, and repeating the above steps i-iv.

2. The method for sequential testing of filters (1) according to claim 1, wherein the first assembly further comprises a device (10) for generating particle-free air, the device (10) being connected to the aerosol generator (4) and an exhaust line (14) wherein the aerosol generated by the aerosol generator (4) is mixed with the particle-free air generated by the device (10) to become the raw gas upstream of the filter (1), the raw gas is either completely fed to the exhaust line (14) or is used proportionally for testing the filters (1).

3. The method for sequential testing of filters (1) according to claim 1, wherein the filters (1) are arranged on a carrier (15) with a drive, the filters (1) are positioned relative to the couplers (2, 3) and in sequence.

4. A device for sequential testing of filters (1), comprising a first assembly having an aerosol generator (4) for generating aerosol and a first measuring device (5) for determining an aerosol concentration in a raw gas upstream of a filter (1) to be tested, and a raw gas-side coupler (3) connected at its first end to an upstream side of the filter (1) and connected at its second end via a first shut-off valve (6) to the first assembly (4, 5) and to a non-return valve (11) arranged in parallel with the first shut-off valve (6), a second assembly comprising a device (7) for sucking the raw gas or ambient air upstream side of the filter (1) and a second measuring device (8) for determining an aerosol concentration in a clean gas downstream of the filter (1), and a clean gas-side coupler (2) connected at its first end to a downstream side of the filter (1) and connected at its second end via a second shut off valve (9) to the second assembly (7, 8), and a control device connected to actuating devices of the shut-off valves (6, 9), wherein the shut-off valves (6, 9) do not have a common drive, wherein for testing the filter (1), the couplers (2, 3) are connected to the filter (1) and the shut-off valves (6, 9) are opened, thus the first assembly (4, 5), the filter (1) and the second assembly (7, 8) are connected together, after testing the filter (1) and before disconnecting the couplers (2, 3) from the filter (1), the first shut-off valve (6) is closed so that the non-return valve (11) opens and ambient air flows through the non-return valve (11) into the raw gas-side coupler (3) to flush out any raw gas in the raw gas-side coupler (3), then the second shut-off valve (9) is closed so that no ambient air flows into the clean gas-side coupler (2), wherein with the shut-off valves (6, 9) being closed, both the couplers (2, 3) are disconnected from the tested filter (1), and both the couplers (2, 3) are then connected to the next filter (1) to be tested.

5. The device for the sequential testing of filters (1) according to claim 4, wherein the first assembly further comprises a device (10) for generating particle-free air, the device (10) being connected to the aerosol generator (4).

6. The device for the sequential testing of filters (1) according to claim 4, wherein the first assembly further comprises an exhaust line (14), and wherein the aerosol generated by the aerosol generator (4) is mixed with the particle-free air generated by the device (10) to become the raw gas upstream of the filter (1), the raw gas is either fed completely to the exhaust line (14) or used in part for testing the filters (1).

7. The device for the sequential testing of filters (1) according to claim 4, wherein the couplers (2, 3) are each connected to a drive for connecting/disconnecting the couplers (2, 3) to/from the filter (1) to be tested, and the drives are connected to the control device.

8. The device for the sequential testing of filters (1) according to claim 4, wherein the device further comprises a carrier (15) with a drive, wherein the filters (1) are arranged on the carrier (15) relative to the couplers (2, 3), and in succession.

9. The device for sequential testing of filters (1) according to claim 4, wherein the filters (1) are arranged on a carrier (15) with a drive, and the filters (1) are arranged relative to the couplers (2, 3) and in sequence.

10. The device for the sequential testing of filters (1) according to claim 5, wherein the first assembly further comprises an exhaust line (14) connected to the device (10) for generating particle-free air, wherein the aerosol generated by the aerosol generator (4) is mixed with the particle-free air generated by the device (10) to become the raw gas upstream of the filter (1), the raw gas is either fed completely to the exhaust line (14) or used in part for testing the filters (1).

11. The device for the sequential testing of filters (1) according to claim 5, wherein the couplers (2, 3) are each connected to a drive for connecting/disconnecting the couplers (2, 3) to/from the filter (1) to be tested, and the drives are connected to the control device.

12. The device for the sequential testing of filters (1) according to claim 6, wherein the couplers (2, 3) are each connected to a drive for connecting the couplers (2, 3) to the filter (1) to be tested, and the drives are connected to the control device.

13. The device for the sequential testing of filters (1) according to claim 5, wherein the device further comprises a carrier (15) with a drive, wherein the filters (1) are arranged on the carrier (15) relative to the couplers (2, 3), and in succession.

14. The device for the sequential testing of filters (1) according to claim 6, wherein the device further comprises a carrier (15) with a drive, wherein the filters (1) are arranged on the carrier (15) relative to the couplers (2, 3), and in succession.

15. The device for the sequential testing of filters (1) according to claim 7, wherein the device further comprises a carrier (15) with a drive, wherein the filters (1) are arranged on the carrier (15) relative to the couplers (2, 3), and in succession.

16. The device for the sequential testing of filters (1) according to claim 10, wherein the device further comprises a carrier (15) with a drive, wherein the filters (1) are arranged on the carrier (15) relative to the couplers (2, 3), and in succession.

17. The device for the sequential testing of filters (1) according to claim 11, wherein the device further comprises a carrier (15) with a drive, wherein the filters (1) are arranged on the carrier (15) relative to the couplers (2, 3), and in succession.

18. The device for the sequential testing of filters (1) according to claim 12, wherein the device further comprises a carrier (15) with a drive, wherein the filters (1) are arranged on the carrier (15) relative to the couplers (2, 3), and in succession.

* * * * *